(No Model.)  2 Sheets—Sheet 1.

F. S. STRONG.
SAW CYLINDER FOR COTTON SEED LINTERS AND GINS.

No. 314,748. Patented Mar. 31, 1885.

WITNESSES
Chas. Spaulding.
Albert D. Grover.

INVENTOR
Frederick S. Strong
Per Frank G. Parker Atty (No Model.) 2 Sheets—Sheet 2.

F. S. STRONG.
SAW CYLINDER FOR COTTON SEED LINTERS AND GINS.

No. 314,748. Patented Mar. 31, 1885.

WITNESSES
Chas Spaulding
Albert D. Grover

INVENTOR
Frederick S. Strong
Per Frank G. Parker Atty.

UNITED STATES PATENT OFFICE.

FREDERICK S. STRONG, OF EAST BRIDGEWATER, MASSACHUSETTS, ASSIGNOR TO THE CARVER COTTON GIN COMPANY, OF SAME PLACE.

SAW-CYLINDER FOR COTTON-SEED LINTERS AND GINS.

SPECIFICATION forming part of Letters Patent No. 314,748, dated March 31, 1885.

Application filed July 5, 1884. (No model.)

*To all whom it may concern:*

Be it known that I, FREDERICK S. STRONG, of East Bridgewater, in the county of Plymouth and State of Massachusetts, have invented a new and useful Improvement in Saw-Cylinders for Cotton-Seed Linters and Gins, of which the following, taken in connection with the accompanying drawings, is a specification.

The objects of my invention are to so construct a cylinder for holding the saws that each saw shall have a metallic bearing, so that it may be always true; also, to so arrange the parts that the saws may be readily detached from the cylinder, repaired, and replaced, without the aid of a machinist, or the saws may be removed and new ones put in their places. I attain these objects by the mechanism illustrated in the accompanying drawings, in which—

Figure 1:
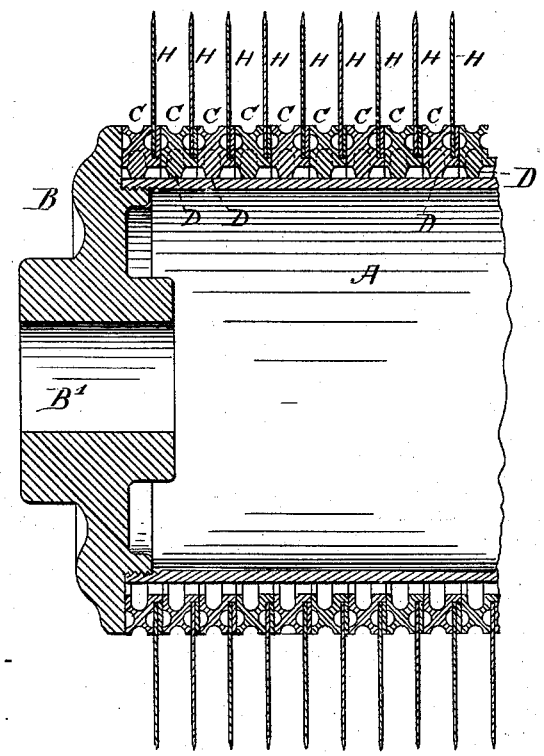
Figure 2:
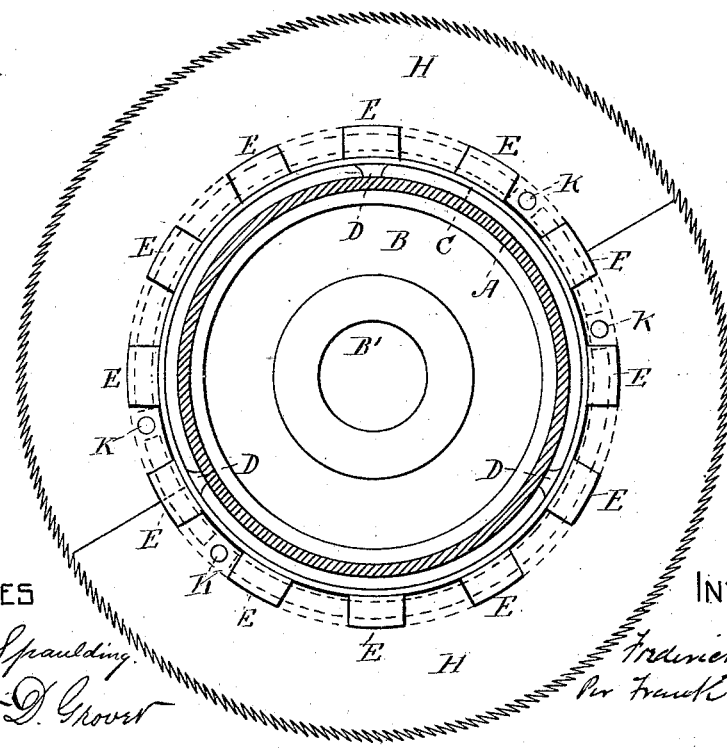
Figure 3:
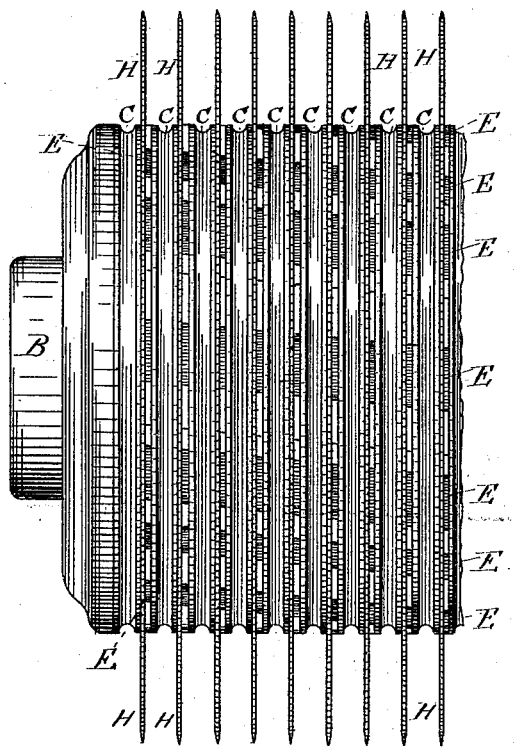
Figure 4:
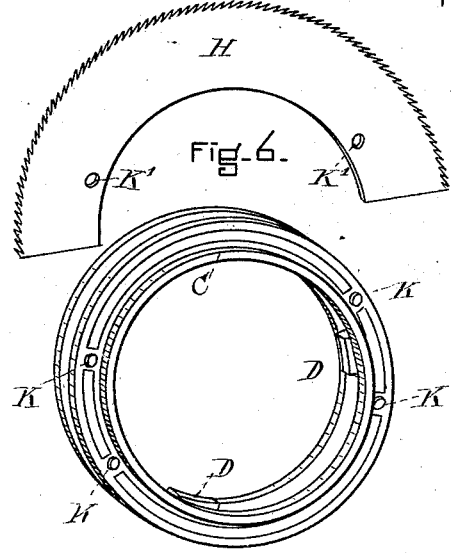
Figure 5:
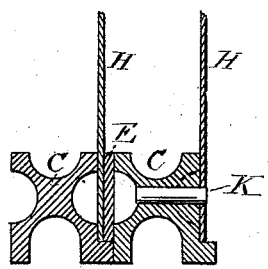
Figure 7:
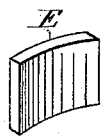

Figure 1 is a longitudinal vertical section of a part of the saw-cylinder, showing the saws in position. Fig. 2 is a cross-section of the iron pipe, the saw-sections, studs, and wedges being shown in elevation. Fig. 3 is an elevation of a part of a cylinder, showing the saws in position. Fig. 4 is a perspective view of one of the binding-rings. Fig. 5 is a detail showing a section through two of the binding-rings. Fig. 6 shows a segment of one of the saws. Fig. 7 represents a wooden wedge which is used for forcing the saws against their metallic bearings.

The foundation of my cylinder consists of an iron pipe, A, which is turned true, and has screwed into it head-pieces, B, Figs. 1, 2, and 3. These head-pieces are bored out, as shown at B', Figs. 1 and 2, for receiving the arbor of the cylinder.

C C C C, Figs. 1, 2, and 3, are metal rings made in the form shown in the perspective view, Fig. 4, a section of the same being shown in Fig. 5. The interior of each of these rings is provided with a number of bearing-bosses, D, Figs. 1, 2, and 4. The interior or bearing surface of each of these bosses is turned off true, so as to accurately fit the iron pipe A. The saw-bearing surfaces of each of these rings are turned off true, so that when the saws are placed against the rings they will be true. Each of the rings C is provided with short studs K K, Figs. 2 and 4, one of which is also shown at K, Fig. 5. These studs accurately fit into the holes K' K', Fig. 6, made in the saws H.

E, Fig. 7, represents a thin block of wood, which serves as a wedge for firmly holding the saws H in the grooves formed between the rings C. One of these wedges is shown in position at E, Fig. 5. They are also indicated by E, Figs. 1, 2, and 3.

To put my cylinder together I proceed as follows: The pipe A is screwed onto one of the head-pieces B, then the rings C C C C are slipped onto the pipe A, and the other head-piece screwed on. The dimensions of all the parts are such that when the two head-pieces are screwed firmly up they bind all of the rings C C C C, so that they are immovable. The saw-sections are taken one by one and slipped into the grooves between the rings, and so adjusted that the pins K K, Fig. 4, shall enter the holes K' K' in the saw-sections H, Fig. 6. Then the wedges E, one of which is shown at E, Fig. 5, are driven in, thus binding each saw-section firmly in its place. The relative positions of these wedges E and the studs K K are represented clearly in Fig. 2.

What I claim as my invention, and desire to secure by Letters Patent, is—

A saw-cylinder for cotton-seed linters and gins, comprising the pipe A, end pieces, B, the rings C C C C, having studs K K, the sectional saws H, having holes K' K', and the wedges E E, substantially as described, and for the purpose set forth.

FREDERICK S. STRONG.

Witnesses:
FRANK G. PARKER,
CHAS. SPAULDING.